United States Patent
Kajimoto

(10) Patent No.: US 11,429,170 B2
(45) Date of Patent: Aug. 30, 2022

(54) DISPLAY APPARATUS THAT CONTROLS ELECTRIC CURRENT SUPPLIED TO DISPLAY BASED ON THE DISPLAYED IMAGE

(71) Applicant: DENSO TEN Limited, Kobe (JP)

(72) Inventor: Nobuaki Kajimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/324,193

(22) Filed: May 19, 2021

(65) Prior Publication Data
US 2022/0043498 A1    Feb. 10, 2022

(30) Foreign Application Priority Data
Aug. 5, 2020    (JP) .............................. JP2020-132969

(51) Int. Cl.
*G06F 1/28*    (2006.01)
*G09G 3/20*    (2006.01)

(52) U.S. Cl.
CPC ................. *G06F 1/28* (2013.01); *G09G 3/20* (2013.01); *G09G 2330/021* (2013.01); *G09G 2360/18* (2013.01)

(58) Field of Classification Search
None
See application file for complete search history.

(56) References Cited

U.S. PATENT DOCUMENTS

| 2006/0077200 A1* | 4/2006 | Tamayama | G06F 1/3265 345/211 |
| 2010/0164698 A1* | 7/2010 | Tsubooka | G07C 5/0825 340/425.5 |
| 2015/0294617 A1* | 10/2015 | Yoon | G09G 3/3225 345/212 |
| 2017/0294156 A1* | 10/2017 | Pyo | G09G 3/3233 |

FOREIGN PATENT DOCUMENTS

JP    2006-113212 A    4/2006

\* cited by examiner

*Primary Examiner* — Amr A Awad
*Assistant Examiner* — Donna V Bocar
(74) *Attorney, Agent, or Firm* — Oliff PLC

(57) ABSTRACT

A display apparatus includes a display and a controller. The controller is configured to receive, from the display, an arithmetic value for electric current consumption of the display; estimate the electric current consumption of the display based on the arithmetic value that was received; and when the estimated electric current consumption of the display is equal to or greater than a predetermined electric current threshold, decrease an electric current to be supplied to the display. The arithmetic value is calculated based on pixel value information.

6 Claims, 5 Drawing Sheets

DISPLAY APPARATUS THAT CONTROLS ELECTRIC CURRENT SUPPLIED TO DISPLAY BASED ON THE DISPLAYED IMAGE

BACKGROUND OF THE INVENTION

Field of the Invention

The invention relates to a display apparatus, a display system, and a controlling method of a display apparatus.

Description of the Background Art

Conventionally, a display apparatus has been known that decreases a drive electric current that is supplied to light emitting elements of the display apparatus when a voltage of power supplied from a battery is a threshold value or smaller. Moreover, for example, a technology has been known that decreases a luminance of an organic electroluminescence display to move the display into a power saving mode when a battery voltage of a mobile device, such as a smartphone and a tablet device, is low.

In a display apparatus that is supplied with power by a wire harness, there is a possibility that a decrease in a voltage of a battery of a vehicle, which is a power source of the display apparatus, causes an electric current greater than an allowable electric current to flow in the wire harness. Such a phenomenon may happen, for example, when the display apparatus is used at a boosted battery voltage. In order to prevent such a phenomenon, the display apparatus that is supplied with the power by the wire harness may be configured to include the foregoing power saving mode so that the electric current greater than the allowable electric current does not flow in the wire harness.

However, in this configuration, in a case where a decrease in voltage of the battery frequently happens, luminances of images decrease frequently so that a user may feel difficult to watch the images. For example, if a vehicle includes a start-stop system (idle stop system), the voltage of the battery decreases while an engine of the vehicle is being stopped by the start-stop system. Thus, there is a possibility that whenever the start-stop system works, the luminances of the images decrease so that the user feels difficult to watch the images.

SUMMARY OF THE INVENTION

According to one aspect of the invention, a display apparatus includes a display and a controller. The controller is configured to receive, from the display, an arithmetic value for electric current consumption of the display; estimate the electric current consumption of the display based on the arithmetic value that was received; and when the estimated electric current consumption of the display is equal to or greater than a predetermined electric current threshold, decrease an electric current to be supplied to the display. The arithmetic value is calculated based on pixel value information.

An object of the invention is to supply a technology that controls an electric current flow greater than an allowable electric current in a wire harness and prevents a user from feeling difficult to watch an image.

These and other objects, features, aspects and advantages of the invention will become more apparent from the following detailed description of the invention when taken in conjunction with the accompanying drawings.

DESCRIPTION OF THE EMBODIMENTS

An exemplary embodiment of the invention will be described below with reference to the drawings.

1. DISPLAY SYSTEM

Figure 1:
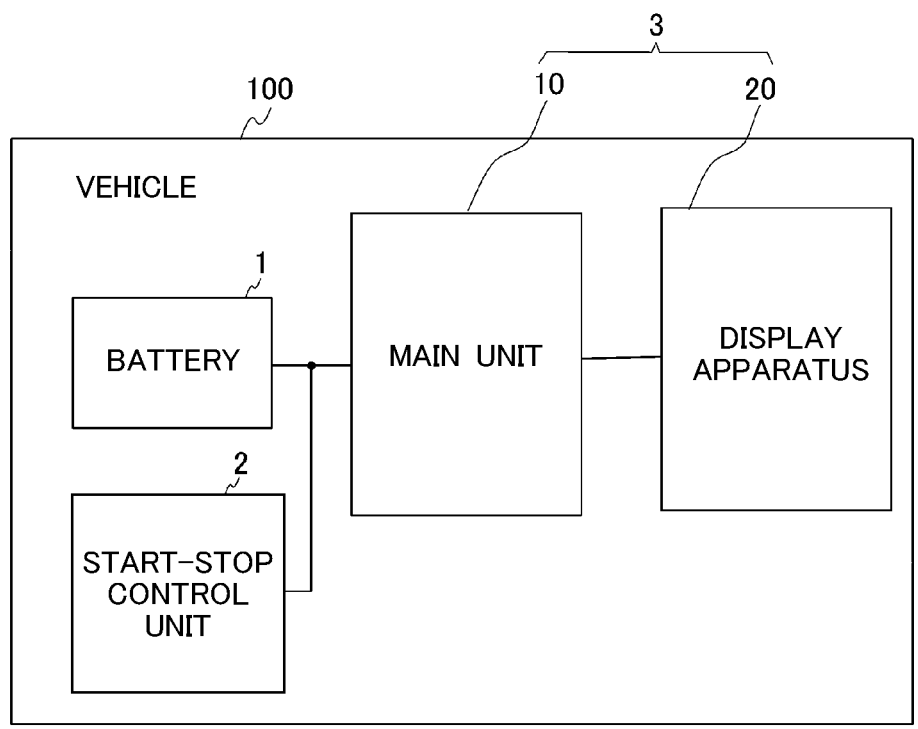
FIG. 1 is a schematic diagram showing a configuration of a vehicle in which a display system of an embodiment is installed.

FIG. 1 is a schematic diagram showing a configuration of a vehicle 100 in which a display system 3 of the embodiment is installed. More specifically, the vehicle 100 is an automobile. However, a vehicle that includes this invention may be a vehicle other than an automobile, such as a train vehicle. As shown FIG. 1, the vehicle 100 includes a battery 1, a start-stop control unit 2, and the display system 3.

The battery 1 is, for example, a lead-acid battery. The battery 1 supplies power to electrical devices, units, components etc. in the vehicle 100. The battery 1 is disposed, for example, in an engine compartment of the vehicle 100.

The start-stop control unit 2 includes an electronic control unit. The start-stop control unit 2 is supplied with the power from the battery 1. The start-stop control unit 2 stops an engine (not illustrated) of the vehicle 100 based on a predetermined stop condition, and restarts the engine of the vehicle 100 based on a predetermined restart condition. In other words, the vehicle 100 includes a start-stop function.

The predetermined stop condition is defined, for example, as a state in which the vehicle 100 is being stopped and the vehicle 100 can stop idling of the engine. A state in which the vehicle 100 can stop idling of the engine means a state in which even if the vehicle 100 stops the idling, the vehicle 100 can maintain enough braking force, and power is stored in the battery 1 to restart the engine. Whether or not the vehicle 100 is stopped is determined, for example, based on a signal indicative of revolution per minute of the engine, a signal indicative of speed of the vehicle 100, etc. Whether or not the vehicle 100 can maintain the braking force is determined based on, for example, a signal indicative of a brake negative pressure. A power storage status of the battery 1 is determined, for example, based on a signal indicative of a voltage of the battery 1.

Moreover, the predetermined restart condition is defined, for example, as a detection of a user (driver) operation to restart the engine of the vehicle 100 or a detection of an event that should restart the engine of the vehicle 100. The user operation to restart the engine of the vehicle 100 is determined, for example, based on a signal indicative of presence/absence of a brake operation, a signal indicative of an accelerator pedal opening degree, etc.

The display system 3 includes a main unit 10 and a display apparatus 20. The main unit 10 and the display apparatus 20 are installed in the vehicle 100. The main unit 10 is supplied with the power from the battery 1. The main unit 10 is electrically connected to the battery 1 by, for example, a wire harness. Some examples of the main unit 10 are a navigation apparatus, an audio apparatus, a display audio, and a navigation apparatus having an audio function.

The display apparatus 20 is connected to the main unit 10 by a wire harness 30. The display apparatus 20 is supplied with power by the wire harness 30. The battery 1 is a power source of the display apparatus 20. The wire harness 30 is an aggregation that is a bundle of wires for power supply and signal communication. As shown in this embodiment, the main unit 10 is easily electrically connected to the display apparatus 20 by use of the wire harness 30.

In this embodiment, the display apparatus 20 is a device for watching television, a DVD content, and the like in a rear seat in a cabin of the vehicle 100. The display apparatus 20 is for so-called rear seat entertainment (RSE) system. The display apparatus 20 is disposed, for example, on a backside of a driver seat or a passenger seat in a front row, on a ceiling of the cabin, etc. The voltage (ex. 12 V) of the battery 1 is boosted to a predetermined voltage (ex. 24 V), and a display of the display apparatus 20 works with the power at the predetermined voltage.

2. DISPLAY APPARATUS

Figure 2:
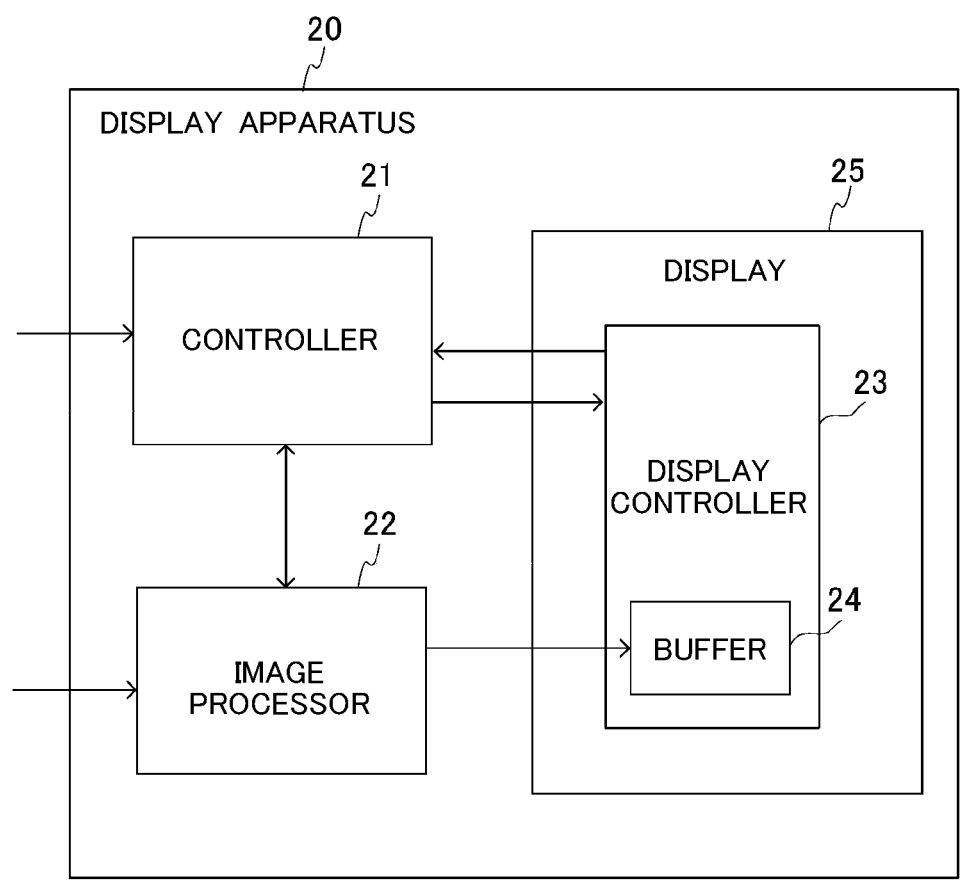
FIG. 2 is a block diagram showing a configuration of the display apparatus.

FIG. 2 is a block diagram showing a configuration of the display apparatus 20 of this embodiment. As shown in FIG. 2, the display apparatus 20 includes a controller 21, an image processor 22, a display controller 23, a buffer 24, and the display 25.

The controller 21 controls the entire display apparatus 20. In this embodiment, the controller 21 is a computer including, for example, a central processing unit (CPU), a random access memory (RAM), a read only memory (ROM), etc. In this embodiment, the controller 21 performs voltage monitoring processing for monitoring the voltage of the battery 1. Moreover, when a predetermined condition is satisfied, the controller 21 performs electric current control processing that decreases an electric current to be supplied to the display 25. In this embodiment, the electric current control processing temporarily decreases the electric current to be supplied to the display 25. Details of the voltage monitoring processing and the electric current control processing will be described later.

The voltage monitoring processing and the electric current control processing are functions that are realized by a CPU that performs an arithmetic processing based on a program stored in a memory, such as a ROM.

The image processor 22 performs various types of processing of image information (image signals) input from an outside of the image processor 22. The image processor 22 is an integrated circuit. The image processor 22, if necessary, performs the processing, such as combining images, enlarging/reducing a size of an image, and/or adjusting a color tone of the image. The image processor 22 sends the processed image information to the display controller 23 by, for example, low voltage differential signaling (LVDS).

In this embodiment, the image information is input from the main unit 10 in a communication method, such as gigabit video interface (GVIF) and IEEEBUS.

The display controller 23 controls the display 25. The display controller 23 is, for example, an application specific integrated circuit (ASIC). In this embodiment, the display controller 23 includes the buffer 24. More specifically, the image information output from the image processor 22 is input to the buffer 24. The buffer 24 temporarily stores the image information of an image that is displayed on the display 25. The buffer 24 is, for example, a line buffer. The buffer 24 may be separated from the display controller 23.

In this embodiment, the display controller 23 calculates an arithmetic value for an electric current consumption of the display 25 based on pixel value information included in the image information stored in the buffer 24. In other words, the display controller 23 functions as a calculator that calculates the arithmetic value. The display apparatus 20 includes the calculator 23 that calculates the arithmetic value for the electric current consumption of the display 25 based on the pixel value information included in the image information stored in the buffer 24. The arithmetic value calculated by the calculator 23 is sent to the controller 21 in a communication method, such as a serial peripheral interface (SPI). Processing performed by the calculator 23 to calculate the arithmetic value will be described later in details.

A portion of functions performed by the controller 21, the image processor 22 and the display controller 23 including the buffer 24 may be performed by software by use of an integrated circuit such as a microcomputer. For example, a portion of the functions that are performed by the image processor 22 and/or the display controller 23 in this embodiment may be performed by the controller 21.

Figure 3:
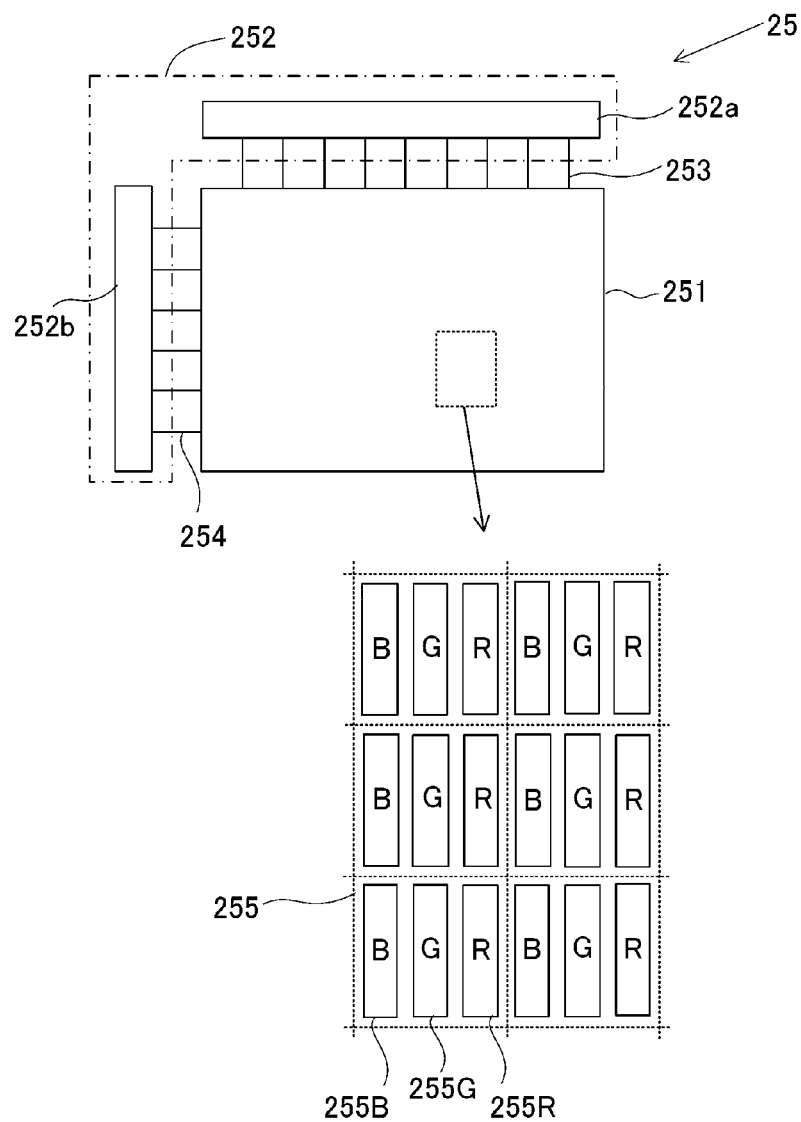
FIG. 3 is a schematic diagram showing an OLED display.

The display 25 displays the image under control of the display controller 23 based on the image information input from the image processor 22. In this embodiment, the display 25 is an organic electroluminescence (hereinafter referred to also as "OLED") display. FIG. 3 is a schematic diagram showing the OLED display 25. The OLED display 25 includes an OLED panel 251 and a panel drive circuit 252. The panel drive circuit 252 includes a column driver 252a and a row driver 252b.

The OLED panel 251 displays the image by drive of the column driver 252a and the row driver 252b. The column driver 252a provides a signal to a signal line 253. The row driver 252b provides a signal to a scan line 254. A plurality of the signal lines 253 and a plurality of the scan lines 254 are arranged in a matrix form on the OLED panel 251. When the OLED panel 251 displays the image, while the row driver 252b is cyclically scanning a plurality (M lines) of the scan lines 254, the column driver 252a provides the electrical signal to at least one of a plurality (N lines) of the signal lines 253 so that an organic electroluminescence diode (not illustrated) at an intersection of the signal line 253 and the scan line 254 emits light. Thus, the image is displayed on the OLED panel 251.

Pixels 255 are arranged in a two-dimensional matrix form on an image display surface of the OLED panel 251. Each of the pixels 255 includes a first subpixel 255R, a second subpixel 255G, and a third subpixel 255B. In this embodiment, the first subpixel 255R emits red light, the second subpixel 255G emits green light, and the third subpixel 255B emits blue light. In other words, organic light emitting diodes that emit red light, green light, and blue light are arranged as the subpixels 255R, 255G and 255B, respectively. Each of the pixels 255 controls luminances of the subpixels 255R, 255G and 255B so as to emit light in various colors. More specifically, the pixel value information included in the image information includes pixel values (luminance value) of the three subpixels 255R, 255G and 255B of the pixels 255.

Number of subpixels included in each of the pixels 255 of the OLED panel 251 is not limited to three described in this embodiment and may be changed properly. Combination of the colors that the subpixels emit may be changed properly. For example, each of the pixels 255 of the OLED panel 251 may include four subpixels that emit red light, green light, blue light, and white light, respectively.

Figure 4:
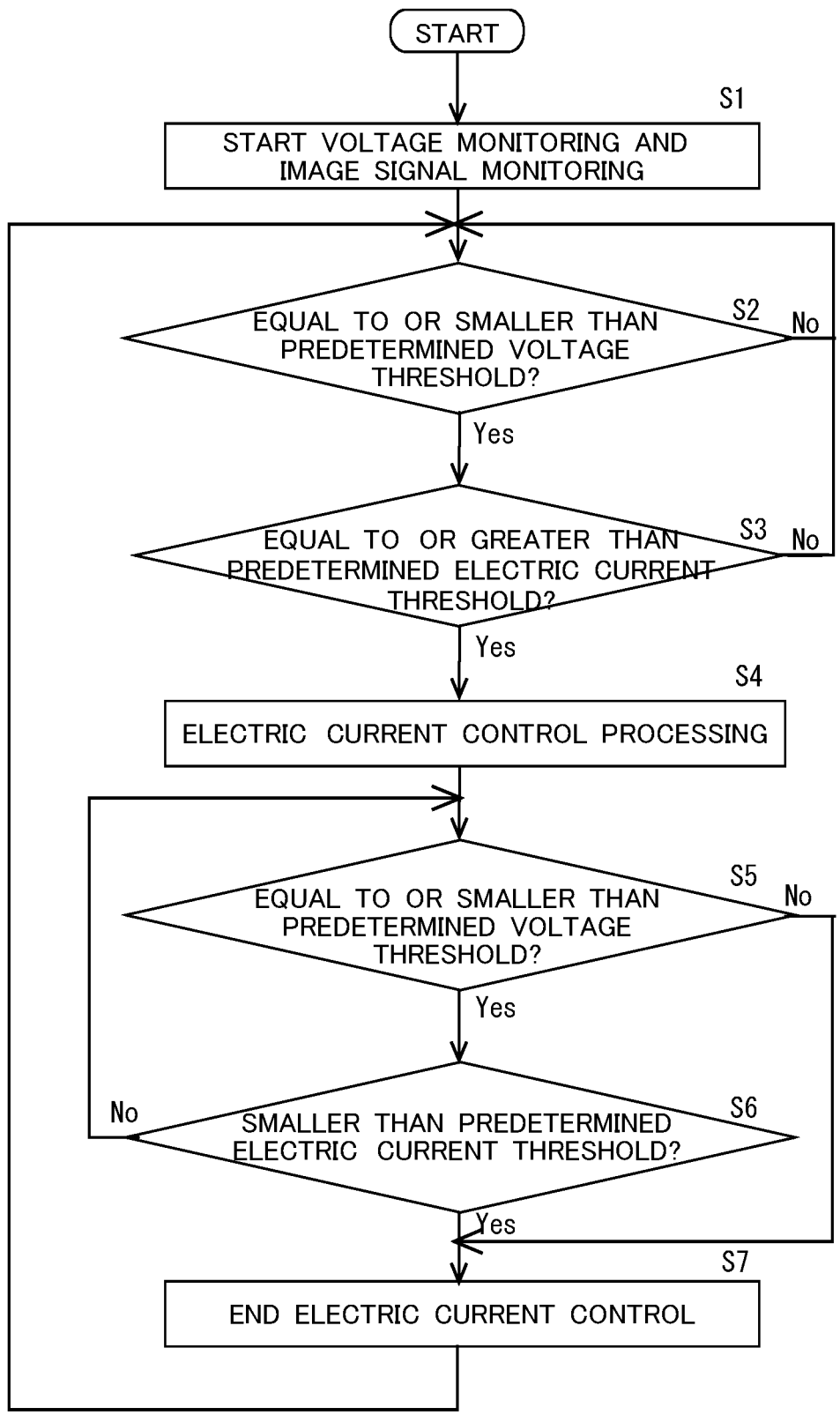
FIG. 4 is a flowchart showing an electric current control that is performed by the display apparatus.

FIG. 4 is a flowchart showing the electric current control processing (hereinafter also referred to simply as "electric current control") that is performed by the display apparatus 20 in this embodiment. The electric current control shown in FIG. 4 is repeated while an image is displayed on the display apparatus 20. The electric current control shown in FIG. 4 is not performed while no image is displayed on the display apparatus 20.

In a step S1, the voltage monitoring processing (hereinafter also referred to simply as "voltage monitoring") and image signal monitoring are started. The voltage monitoring processing is for monitoring the voltage of the battery 1. The voltage monitoring is performed by the controller 21 that receives a voltage value of the battery 1. The image signal monitoring is for monitoring the electric current consumption of the display 25. When the image signal monitoring is started, the display controller (calculator) 23 starts the processing that calculates the arithmetic value for the electric current consumption of the display 25. Moreover, the monitoring of the arithmetic value is started by the controller 21 that receives the arithmetic value from the display controller 23. When the voltage monitoring and the image signal monitoring are started, the processing moves to a next step S2.

Before an explanation of the step S2, the foregoing arithmetic value for the electric current consumption of the display 25 will be described. The arithmetic value for the electric current consumption of the display 25 is calculated based on the pixel value information included in the image information that is stored in the buffer 24. The display 25 that includes the OLED panel 251 consumes more electric current as a luminance of the image that is displayed on the display 25 is higher. If the pixel value of each pixel of the image that is displayed on the display 25 is obtained, the electric current consumption can be estimated. Thus, the arithmetic value for the electric current consumption of the display 25 is calculated based on the pixel value of each pixel of the image that is displayed on the display 25. The arithmetic value may be the electric current value of the estimated electric current consumption. However, the arithmetic value may be a value other than the electric current value if the electric current consumption of the display 25 can be estimated based on the value.

For example, in a case where the buffer 24 is a line buffer, the arithmetic value for the electric current consumption of the display 25 may be calculated, for example, as shown below. The display controller 23 takes one scan line 254 of the OLED panel 251 in order. The display controller 23 sums pixel values of the pixels 255 (more specifically, each pixel has values of the three subpixels R, G, and B) on the one scan line 254 of a frame of the images to calculate a line value of the one scan line 254. Then the display controller 23 adds the line value of the one scan line 254 to a sum of previously calculated line values to derive a sum so far. The display controller 23 repeats the calculation. When the frame is changed to another, the display controller 23 resets the values. The values are reset to zero. Whenever the display controller 23 calculates the sum, the display controller 23 calculates a brightness ratio (ex. expressed by percentage) by dividing the sum by a sum of all pixel values of a white image frame that consists of pixels that are all white.

When the brightness ratio is calculated, the electric current consumption of the display 25 can be estimated. In other words, the brightness ratio is one of the arithmetic values for the electric current consumption of the display 25. Once calculating the brightness ratio, the display controller 23 sends the brightness ratio as the arithmetic value to the controller 21. The display controller 23 may send, to the controller 21, a value of the electric current consumption estimated based on the brightness ratio. Moreover, the display controller 23 may be configured to send, to the controller 21, the foregoing sum as the arithmetic value for the electric current consumption. In this case, the foregoing brightness ratio may be calculated by the controller 21.

In the step S2, the controller 21 determines whether or not the voltage (voltage value) of the battery 1 is equal to or smaller than a predetermined voltage threshold. The predetermined voltage threshold may be experimentally determined. The predetermined voltage threshold may be, for example, a voltage value of the battery 1 that is decreased due to idling control (stop) of the engine of the vehicle 100. A failure caused by a decrease in voltage of the battery 1 during the idling control of the engine of the vehicle 100 can be improved by setting the predetermined voltage threshold as shown above.

When the voltage value of the battery 1 is equal to or smaller than the predetermined voltage threshold (Yes in the step S27), the controller 21 moves to a next step S3. Meanwhile, when the voltage value of the battery 1 is greater than the predetermined voltage threshold (No in the step S2), the controller 21 repeats the step S2, a determination step.

In the step S3, the controller 21 determines, based on the arithmetic value input from the display controller 23, whether the electric current consumption of the display 25 is estimated to be equal to or greater than the predetermined electric current threshold. The controller 21 may convert the arithmetic value input from the display controller 23 into an electric current consumption value to determine whether or not the converted value is equal to or greater than the predetermined electric current threshold. In this case, for example, the predetermined electric current threshold may be a value, such as a greatest electric current consumption value of the display 25 that does not cause an electric current flow greater than an allowable electric current in the wire harness 30 even without performing the electric current control processing (described later) when the voltage of the battery 1 decreases. For example, the predetermined electric current threshold may be determined from experiments.

In a case where the arithmetic value is the foregoing brightness ratio, a predetermined brightness ratio threshold may be set, and the controller 21 may be configured to determine whether the electric current consumption of the display 25 is estimated to be equal to or greater than the predetermined electric current threshold by comparing the arithmetic value to the predetermined brightness ratio threshold. The predetermined brightness ratio threshold may be determined based on experiments similarly to the predetermined electric current threshold. The predetermined brightness ratio threshold is derived, for example, as below. The brightness ratio 100% is a value for a case in which all the pixels of an image frame are white. The predetermined brightness ratio threshold is derived, for example, by multiplying 100% of the brightness ratio by a figure greater than zero and smaller than one. For example, in a case where the predetermined brightness ratio threshold is 50%, when a brightness ratio calculated as the arithmetic value is 50% or greater, the electric current consumption of the display 25 is estimated to be equal to or greater than the predetermined electric current threshold.

When the electric current consumption of the display 25 is estimated to be equal to or greater than the predetermined electric current threshold based on the arithmetic value input from the display controller 23 (Yes in the step S3), the controller 21 moves to a next step S4. When the electric current consumption of the display 25 is estimated not to be equal to or greater than the predetermined electric current threshold (No in the step S3), the controller 21 moves back to the step S2.

In the step S4, the controller 21 performs the electric current control processing that decreases the electric current to be supplied to the display 25. In other words, in this embodiment, the predetermined condition for performing the electric current control processing includes a case in which the electric current consumption of the display 25 is estimated to be equal to or greater than the predetermined electric current threshold based on the arithmetic value calculated by the display controller (calculator) 23. According to this embodiment, when an image that is displayed on the display 25 is estimated to be bright, the electric current control processing is performed to control the electric current to be supplied to the display 25. Thus, an electric current flow greater than the allowable electric current in the wire harness 30 can be prevented. Moreover, only when the image is so bright that the electric current consumption of the display 25 is estimated to be high, a change is made to the image that is displayed on the display 25. Thus, a possibility that the user feels difficult to watch the image can be reduced.

In this embodiment, in addition to the foregoing condition, another predetermined condition for performing the electric current control processing is a case in which the voltage value of the battery 1, the power source of the display apparatus 20, is equal to or smaller than the predetermined voltage threshold. In other words, in this embodiment, the electric current control processing is performed when the two conditions are satisfied, one of which is that the voltage value of the battery 1 is equal to or smaller than the predetermined voltage threshold, and the other of which is that the electric current consumption of the display 25 is estimated to be equal to or greater than the predetermined electric current threshold based on the arithmetic value calculated by the display controller 23.

According to this embodiment, when the voltage of the battery 1 is low, the electric current to be supplied to the display 25 can be controlled. Thus, decrease of the battery 1 can be slowed. Moreover, in a case where the display apparatus 20 boosts the voltage of the battery 1 to use the boosted voltage like this embodiment, when the voltage of the battery 1 decreases, a large electric current possibly flows in the wire harness 30. However, in this embodiment, when the voltage of the battery 1 decreases (or the voltage of the battery 1 is low) and the electric current consumption of the display 25 is estimated to be high, the electric current control processing is performed. Thus, there is a low possibility that an electric current greater than the allowable electric current flows in the wire harness 30.

The electric current control processing may include a step that decreases the luminance of the image that is displayed on the display 25. In this embodiment, the electric current control processing decreases the luminance of the display 25. According to this, a relatively simple control that is performed by the controller 21 can decrease the electric current consumption. Moreover, only when the image is bright, the luminance is decreased. Thus, a change of the image is less recognizable.

In order to decrease the luminance of the image, the step may uniformly decrease a ratio (duty cycle) of a lighting period of each OLED, controlled, for example, in a pulse width modulation (PWM). A degree of decrease in the duty cycle is determined, based on experiments. The controller 21 commands to the display controller 23 to decrease the duty cycle that is controlled in the PWM. The display controller 23 changes a condition of the PWM control based on a command of the controller 21 and performs display control of the image based on the changed condition.

In a case where the step that decreases the luminance is performed, the step may decrease the luminances of all the colors RGB or the step may decrease the luminance only of a color (e.g. red and/or blue) of which change to the luminance is less recognizable for the user. Thus, the possibility that the user feels difficult to watch the image can be further reduced.

The electric current control processing may include a color tone change step that changes a color tone of the image that is displayed on the display 25. In this case, a bright image can be changed to a darker image so that the electric current consumption can be reduced. In a case where the color tone is changed, for example, the controller 21 may be configured to give a command of a color tone change to the image processor 22 that includes a function of color tone adjustment. The color tone change step may be performed instead of the step that decreases the luminance or may be performed in addition to the step that decreases the luminance.

When the step S4 ends, the controller 21 moves to a step S5. In the step S5, the controller 21 determines whether the voltage of the battery 1 is equal to or smaller than the predetermined voltage threshold. The predetermined voltage threshold is same as the predetermined voltage threshold in the step S2. When the voltage of the battery 1 is equal to or smaller than the predetermined voltage threshold (Yes in the step S5), the controller 21 moves to a next step S6. When the voltage of the battery 1 is greater than the predetermined voltage threshold (No in the step S5), the controller 21 moves to a step S7.

In the step S6, the controller 21 determines whether or not the estimated electric current consumption of the image is smaller than a predetermined electric current threshold. Herein described is a case in which the predetermined electric current threshold is same as the predetermined electric current threshold in the step S3. However, the predetermined electric current threshold in the step S6 may be different from the predetermined electric current threshold in the step S3. The estimated electric current consumption of the image is an electric current consumption estimated for one image frame. For example, the line values of the lines included in a frame are summed to calculate a frame value of the frame. When the brightness ratio that is calculated based on the frame value is smaller than the foregoing predetermined brightness ratio threshold, the controller 21 determines that the estimated electric current consumption is smaller than the predetermined electric current threshold. Moreover, when the brightness ratio that is calculated based on the frame value is equal to or greater than the predetermined brightness ratio threshold, the controller 21 determines that the estimated electric current consumption is equal to or greater than the predetermined electric current threshold. When the controller 21 determines that the estimated electric current consumption of the image is smaller than the predetermined electric current threshold (Yes in the step S6), the controller 21 moves to the next step S7. When the controller 21 determines that the estimated electric current consumption of the image is equal to or greater than the predetermined electric current threshold (No in the step S6), the controller 21 moves back to the step S5. During the step S5 and the step S6, the electric current control is maintained.

In the step S7, the controller 21 ends the electric current control. More specifically, the controller 21 increases the luminance decreased in the step S4 to be the luminance before the step S4. When the step S7 ends, the controller 21 moves back to the step S2. While the display apparatus 20 is displaying images, the foregoing process is repeated.

According to this embodiment, even during the calculation of the frame value for one frame (sum of the line values), when the brightness ratio reaches the predetermined brightness ratio threshold, the luminance of the image is decreased because the electric current consumption of the display 25 is determined to be equal to or greater than the predetermined electric current threshold. In other words, the process that decreases the luminance can be performed quickly.

3. MODIFICATIONS

In the configuration of the foregoing embodiment, the electric current consumption of the display 25 is determined based on the value for one frame of the images. However, this configuration is only an example. The electric current consumption may be determined, for example, based on a plurality of frames of the images or based on scan lines less than all scan lines in a frame.

In the foregoing embodiment, the predetermined electric current threshold is a constant value. However, the predetermined electric current threshold may be changed in accordance with the voltage value of the battery 1, the power source of the display apparatus 20. In this configuration, when the voltage value of the battery 1 decreases, the predetermined electric current threshold may be decreased. Even in this configuration, only when the electric current consumption of the display 25 is estimated to be high due to the bright image, the image on the display 25 can be changed. Thus, a possibility that the user feels difficult to watch the image can be reduced. Further, unless the voltage of the battery 1 is low, the electric current control processing is less likely performed. Thus, the image can be displayed in a stable luminance.

Figure 5:
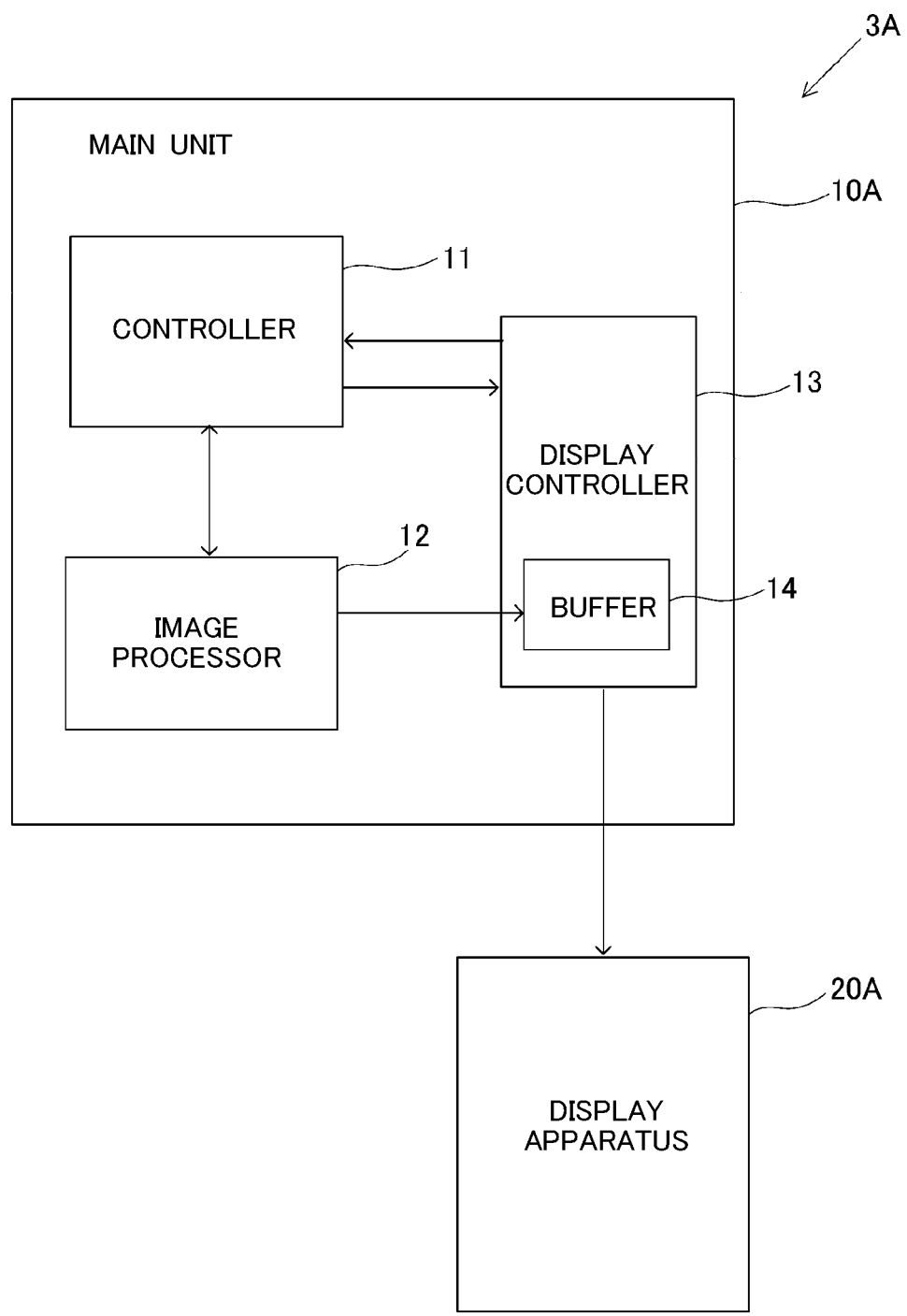
FIG. 5 is a block diagram showing a modification of the display system.

FIG. 5 is a block diagram showing a modification of the display system 3 of the embodiment. A display system 3A of the modification includes a main unit 10A and a display apparatus 20A. The main unit 10A and the display apparatus 20A are connected to each other by the wire harness 30, not illustrated in FIG. 5, similarly as shown in the foregoing embodiment.

In the display system 3A of the modification, an electric current control processing that decreases electric current to be supplied to a display of the display apparatus 20A is performed by the main unit 10A, instead of the display apparatus 20A. Thus, the main unit 10A includes a controller 11, an image processor 12, a display controller (calculator) 13, and a buffer 14. Since those elements 11 to 14 are configured similarly to the controller 21, the image processor 22, the display controller (calculator) 23, and the buffer 24 of the display apparatus 20 in the foregoing embodiment, detailed explanation of those elements is omitted.

In this modification, too, the electric current control processing (e.g. processing that decreases illumination) is performed when a condition is satisfied: the condition is that an electric current consumption of the display apparatus 20A is estimated, based on an arithmetic value calculated by the display controller 23, to be equal to or greater than a predetermined electric current threshold. In this modification, when an image that is displayed on the display of the display apparatus 20A is estimated to be bright, the electric current to be supplied to the display can be controlled. Thus, a flow of an electric current greater than an allowable electric current in the wire harness 30 can be prevented. Moreover, only when the electric current consumption of the display is estimated to be high due to the bright image, the image on the display is changed. Thus, a possibility that the user feels difficult to watch the image on the display apparatus 20A can be reduced. The configuration of this modification is preferable in a case where a high performance integrated circuit is not included in the display apparatus 20A.

Moreover, the foregoing embodiment may be applied to a main unit that is supplied power from the battery by the wire harness and that includes a function as a display apparatus.

4. NOTES

Various technical features disclosed in this specification may be changed without departing from the scope of the invention, in addition to the foregoing embodiments. In other words, the foregoing embodiments are only illustrative and are not restrictive in all respects. A scope of this invention is defined by claims, not by the explanation in those foregoing embodiments, and includes equivalents of the claims and all modifications in the scope of the invention. Moreover, the foregoing embodiments and modifications may be properly combined with one another.

While the invention has been shown and described in detail, the foregoing description is in all aspects illustrative and not restrictive. It is therefore understood that numerous other modifications and variations can be devised without departing from the scope of the invention.

What is claimed is:
1. A display apparatus comprising:
a display; and
a controller that is configured to:
receive, from the display, an arithmetic value for electric current consumption of the display, the arithmetic value being calculated based on pixel value information;
estimate the electric current consumption of the display based on the arithmetic value that was received; and
decrease an electric current to be supplied to the display when i) a voltage value of a battery, which is a power source of the display apparatus, is equal to or smaller than a predetermined voltage threshold, and ii) the estimated electric current consumption of the display is equal to or greater than a predetermined electric current threshold, wherein:
the controller changes the predetermined electric current threshold in accordance with the voltage value of the battery so that as the voltage value of the battery decreases, the predetermined electric current threshold is decreased.
2. The display apparatus according to claim 1, wherein the controller is configured to decrease a luminance of the image that is displayed on the display when decreasing the electric current to be supplied to the display.

3. The display apparatus according to claim 1, wherein the controller is configured to change a color tone of the image that is displayed on the display when decreasing the electric current to be supplied to the display.

4. The display apparatus according to claim 1, wherein the display apparatus is connected to a main unit by a wire harness.

5. A display system comprising:
a main unit that is installed in a vehicle; and
a display apparatus that is connected to the main unit by a wire harness and that is supplied with electric power by the wire harness; wherein
the main unit includes:
   a buffer memory that stores image information of an image that is displayed on a display of the display apparatus; and
   a controller that is configured to decrease an electric current to be supplied to the display apparatus when i) a voltage value of a battery, which is a power source of the display apparatus, is equal to or smaller than a predetermined voltage threshold, and ii) an estimated electric current consumption of the display apparatus is equal to or greater than a predetermined electric current threshold, the estimated electric current consumption of the display apparatus being estimated based on pixel value information of the image information stored in the buffer memory, wherein:
   the controller changes the predetermined electric current threshold in accordance with the voltage value of the battery so that as the voltage value of the battery decreases, the predetermined electric current threshold is decreased.

6. A controlling method of a display apparatus having a display, the method comprising the steps of:
   receiving, from the display, an arithmetic value for electric current consumption of the display, the arithmetic value being calculated based on pixel value information;
   estimating the electric current consumption of the display based on the arithmetic value that was received; and
   decreasing an electric current to be supplied to the display when i) a voltage value of a battery, which is a power source of the display apparatus, is equal to or smaller than a predetermined voltage threshold, and ii) the estimated electric current consumption of the display is equal to or greater than a predetermined electric current threshold, wherein:
   the predetermined electric current threshold is changed in accordance with the voltage value of the battery so that as the voltage value of the battery decreases, the predetermined electric current threshold is decreased.

* * * * *